COATING OR PLASTIC.
106/87
Feb. 19, 1929.
C. E. HITE
1,702,729
INSULATING MATERIAL AND PROCESS OF MAKING THE SAME
Filed April 21, 1924
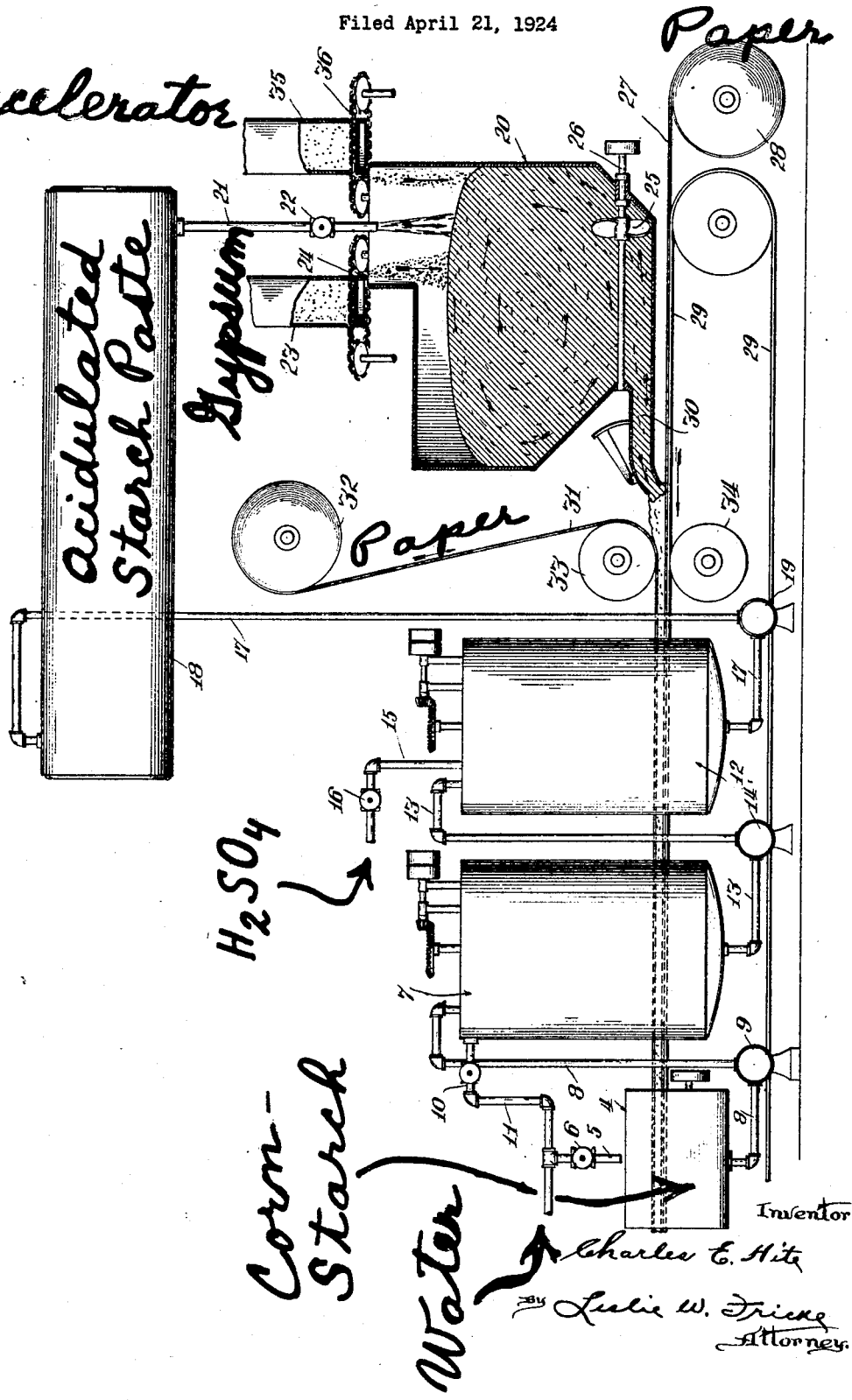

6. COMPOSITIONS, COATING OR PLASTIC.

Patented Feb. 19, 1929.

1,702,729

UNITED STATES PATENT OFFICE.

CHARLES E. HITE, OF PHILADELPHIA, PENNSYLVANIA, ASSIGNOR, BY MESNE ASSIGNMENTS, TO UNIVERSAL GYPSUM & LIME CO, OF CHICAGO, ILLINOIS, A CORPORATION OF DELAWARE.

INSULATING MATERIAL AND PROCESS OF MAKING THE SAME.

Application filed April 21, 1924. Serial No. 707,965.

My invention relates to an improved insulating material and apparatus for and process of manufacturing the same. The term "insulating material" is used generically in the appended claims as meaning blocks, boards, panels or slabs of various kinds for use in the construction of walls, floors, roofs or other purposes, also material suitable for covering steam and hot and cold water pipes, refrigerating machinery, boilers, furnaces and the like. The invention relates particularly to an insulating material, and the manufacture thereof, technically known in the art as "wall board" which is a board having paper liners on its sides and is applied directly to the studding of a building to take the place of both lath and plaster in the finishing of interior walls.

The manufacture of wall board is carried out by continuously advancing a sheet of paper onto one end of a long conveyor belt, depositing the material to form the core of the board, while in a plastic condition, onto said sheet of paper and then applying a sheet of paper onto the deposited plastic material, the whole being passed between a pair of compression rollers which spread the plastic material uniformly between the two sheets of paper. By the time the board reaches the delivery end of the belt, the plastic material has set sufficiently to permit the board to be cut into the desired lengths and the severed sections placed in a drying kiln to eliminate the moisture in excess of the water of crystallization. The core of the board consists mainly of gypsum or gypsite (which is a variety of gypsum and is considered as such throughout this application and the appended claims). Even when substantially pure gypsum is used, a considerable period of time is required for the plastic mixture to set so that the severed lengths of board can be handled readily without damaging them. The length of time required for the plastic mixture to set to the extent mentioned materially slows up production of the board and requires either a very long conveyor belt moving at a fair speed or a short belt moving at a very slow speed. Most deposits of gypsum contain an appreciable amount of mineral impurities such as dolomitic lime, calcium carbonate, magnesium carbonate, clays and other silicates which are of no advantage in the gypsum but in fact are detrimental because they materially increase the length of time required for the material to set and decrease the strength of the finished product. Furthermore, when the plastic mixture sets slowly, the paper liners become saturated with moisture which materially weakens the liners and makes it very difficult to handle the sections of board preparatory to placing them in the kiln without scuffing or otherwise injuring the liners. In order to retard permeation by moisture of the liners while the plastic mixture is taking its initial set, it is common practice to size the liners. The use of sized paper liners, however, is not only more costly than unsized liners but sized paper liners are objectionable because the sizing interferes with the solid particles of the plastic mixture working into the interstices of the paper and, therefore, it is difficult to obtain satisfactory adhesion between the paper liners and the core of the board. One of the objects of my invention is to accelerate the set of the plastic mixture which I have found can be accomplished by incorporating with the ingredients forming the core of the board an agent capable of converting the impurities aforesaid into a salt which acts as an accelerating medium.

It is a further object of my invention to incorporate with the ingredients forming the core of the board a material which will not only convert the carbonates or other impurities into an agent adapted to accelerate the set of the plastic mixture but will also convert the carbonates into their respective sulphates, and thus change the otherwise useless impurities into useful ingredients.

The plastic mixture is preferably formed by preparing, with the aid of heat, a viscous agent of some suitable amylaceous material, for example, corn starch, and water and then mixing comminuted calcined gypsum with the paste. The paste holds the particles of gypsum in suspension during crystallization whereby a strong, durable and porous product can be made. Another object of my invention is to incorporate with the ingredients forming the core of the board an agent adapted by chemical reaction to accelerate the set of the gypsum and which will also increase the viscosity of the viscous agent and improve its adhesive qualities. This and the other objects stated above, I have found, can be accomplished satisfactorily by the use of an acid, such as sulphuric acid. Sulphuric acid chemically reacts with the carbonates or silicates or both if present in the gypsum, and becomes neutralized thereby producing nascent salts in the mixture which materially lessens the time required for the plastic mass to set and the use of unsized liners thus becomes practical; the acid increases the viscosity of the paste and, inasmuch as the acid is cheaper than the amylaceous material which to a limited extent it replaces, there is a saving in this respect; the acid also improves the adhesive qualities of the amylaceous agent and satisfactory adhesion of the paper liners to the core of the board can be better obtained; the acid acts as a paste preservative and prevents it from becoming rancid or sour; and the acid converts the hitherto useless impurities into ingredients useful in the mixture.

Another object of my invention is to accelerate further the set of the acidulated mixture when desired by incorporating with the ingredients forming the core of the board a quantity of comminuted gypsum that contains its water of crystallization.

A further object of my present invention is the provision of an improved method whereby the improved insulating material aforesaid may be manufactured expeditiously and at a minimum expense.

Another object of my present invention is the provision of apparatus of simple construction, efficient in operation and well adapted for continuously carrying out the manufacture of the insulating material.

My invention will be better understood from the following description of a preferred embodiment thereof taken in connection with the accompanying drawing wherein is illustrated a preferred form of apparatus suitable for practicing it.

The means for preparing the viscous agent includes a mixing tank 4 provided with suitable agitating means, for example, a rotatable shaft carrying blades or propellers (not shown) into which a quantity of a suitable amylaceous material for example, corn starch, is dumped, sufficient cold water being admitted to said tank from a supply pipe 5 controlled by a valve 6 to dissolve the starch. The agitating means in the tank 4 is then set in motion, which thoroughly separates the starch granules one from another whereby a thin, starchy, liquor is formed. The liquor is transferred from the mixer 4 into a steam jacketed kettle 7, provided with suitable agitating means such as a vertically disposed rotatable shaft provided with blades or propellers (not shown), through a pipe line 8 by means of a pump 9. A quantity of cold water may then be introduced into the kettle 7 by opening the valve 10 in the water supply pipe 11. The agitating means in the kettle is then set in motion and steam is turned on, the temperature of the diluted starchy liquor in the kettle 7 being gradually raised to approximately 190° F. The gradual and continued application of the heat to and the continuous agitation of the diluted liquor soon results in the individual starch granules being burst and thoroughly mixed with the water whereby the starch and the water are converted into a viscous agent of smooth texture and free of lumps. The heat is turned off, and sufficient cold water is then introduced into the kettle to bring the water content of the viscous agent up to substantially thirty-one times as much, by weight, as that of the starch material and to reduce the agent to the desired temperature, the agitator in the kettle being maintained in motion sufficiently to mix thoroughly the cold water with the cooked paste.

The paste is then transferred from the kettle 7 into a mixing tank 12, also provided with suitable agitating means such as a vertically disposed rotatable shaft having blades or propellers (not shown), through a pipe line 13 by a pump 14. Sulphuric acid is then introduced into the tank 12 through a pipe line 15 controlled by a valve 16 substantially in the proportion, by weight, of one part acid to 200 parts of the paste. The agitator in the tank 12 is operated sufficiently to mix thoroughly the acid with the paste. The acidulated paste is then transferred from the mixing tank 12 through a pipe line 17 to a lead-lined storage tank 18 by means of a pump 19.

The acidulated paste upon being drawn from the tank 18 is thoroughly mixed with comminuted calcined gypsum in the proportion of approximately 83 pounds of the paste to 50 pounds of the gypsum. The proportions of starch, water, acid and gypsum herein stated are based on the assumption that the gypsum contains from 10 to 12% of carbonates or other impurities capable of chemically reacting with the acid.

In order to carry out continuously the process of manufacturing the material, I preferably use a continuous mixer 20 into which the acidulated paste flows from the tank 18 through the pipe 21, its flow being regulated by a valve 22. The gypsum is continuously deposited in the mixer from a source of supply 23 by a suitable continuously operating drag chain 24. The acidulated paste and the gypsum are thoroughly mixed in the mixer 20 by propeller or beater blades 25 mounted on a continuously rotating shaft 26.

In the accompanying drawing I have shown a machine adapted to make wall board having top and bottom paper liners. The bottom liner 27 is unwound from a roll 28 and is continuously advanced onto an endless conveyor belt 29. The plastic mixture is delivered through a discharge spout 30 onto the top surface of the bottom paper liner 27. The top paper liner 31 is unwound from a roll 32 and is continuously advanced underneath a squeeze roller 33 operating above the bottom paper liner and the conveyor belt 29. Another squeeze roller 34 operates opposite the roller 33 under the top run of the conveyor belt 29. The rollers 33 and 34 are spaced a distance apart equal to the thickness of the board to be manufactured. The conveyor 29 and the paper liners travel in the direction indicated by the arrow. As the bottom paper liner 27 with the plastic mixture on it passes between the rollers 33 and 34, the plastic mass is spread out evenly over the bottom liner and the top liner is applied to the top surface of the mass. Any suitable means may be employed to prevent the plastic mass from running out between the paper liners at the side edges until the plastic mass has set sufficiently to hold its shape. By the time the product reaches the end of the conveyor the plastic mass has set sufficiently so that the board may be cut into the desired lengths and placed in a drying kiln to eliminate the moisture in excess of the water of crystallization and the board is then ready for the market.

When wall board is manufactured according to the process herein described, the particles of gypsum are thoroughly and uniformly distributed throughout the acidulated paste and are held in suspension while crystallization takes place. Because of the uniform distribution of the gypsum particles, the resulting product is porous, light in weight and possesses great strength and rigidity. The panels of wall board, after the moisture in excess of the water of crystallization has been eliminated, can be subjected to the roughest kind of treatment without danger of breaking them. Nails may be driven through the panels close to the edges without chipping the core. The panels of the wall board have sufficient strength without bringing the marginal edges of one liner around the side edges of the core and into lapping engagement with the other liner as is commonly done to strengthen the board. The panels, therefore, are reversible and should one side of a panel be damaged in handling, the other side may be used to form the finished wall surface; and, furthermore, the joint filler, if it be used, forms a much better joint with the exposed or uncovered edges of the core than is the case when the edges are covered with paper. Since the board is relatively light in weight, there is a very considerable saving in transportation charges over common wall board and also a considerable saving in cost of production because the light board can be handled more quickly, easily and with less danger of breakage. The numerous minute dead air cells not only provide a relatively light board but they effectively obstruct the passage of sound, heat and cold. The finished board saws easily with a clean cut, there being no chipping or breaking away of the core during the sawing operation.

When sulphuric acid is incorporated with the other ingredients forming the core of the board in the manner herein described, its action upon the paste and the carbonates or other impurities present in the gypsum is certain and uniform. Carbon dioxide gas is evolved when the carbonates are acted upon by the acid which would ordinarily increase the porosity of the core but this gas is of no importance in my invention and it is effectively eliminated by the rapidly operating propeller blades 25 in the mixer 20. The porosity of the core of the board is due to the suspension of the gypsum particles in the paste during crystallization. The use of sulphuric acid as herein described in the manufacture of wall board has the following advantages: (a) The acid chemically reacts with the carbonates or other impurities present in the gypsum and produces nascent salts in the mixture, which materially lessens the time required for the plastic mass to set and, therefore, speeds up production of the board. When no acid is used, other conditions remaining the same, it requires approximately 12 minutes for the board to set so that it can be handled, but, when the acid is used, the time for setting is reduced substantially one-half, an advantage of tremendous importance. (b) Since the acidulated paste and plastic mixture sets in a relatively short period of time, unsized paper liners can be used because the liners do not become permeated with moisture to such an extent as to weaken them materially. (c) Since the use of unsized paper is thus made practical, the particles of gypsum may freely work into the interstices of the paper prior to crystallization, and upon formation of the crystals a mechanical interlocking of the fibers of the liners and the core is obtained. (d) The acid converts the hitherto useless impurities into ingredients highly useful in the mixture. (e) The acid improves the adhesive qualities of the amylaceous paste and augments the natural adhesiveness of the paste thus further aiding in obtaining a satisfactory bond between the paper liners and the core of the board. (f) The action of the acid on the starch tends to increase the viscosity of the paste and, inasmuch as the acid is cheaper than starch which it replaces to some extent, there is a saving in cost of materials. (g) The acid is a paste preservative and prevents it from becoming rancid or sour while in storage.

The set of the acidulated plastic mixture may be increased in excess of that produced by the formation of nascent salts in the mixture, if desired, by incorporating with the ingredients forming the core of the board an accelerating agent in the form of gypsum containing its water of crystallization such as land plaster or a waste material, for example, ground scrap gypsum board or gypsum block. When the gypsum containing its water of crystallization is used to accelerate further the set, it may be introduced into the mixture from a suitable source of supply 35 by a continuously operating drag chain 36, it being thoroughly mixed with the acidulated paste and the comminuted calcined gypsum in the mixer 20.

The relative quantities of the materials herein stated are the best known to me for accomplishing the desired results when the gypsum contains from 10 to 12% carbonates, however, I do not intend to limit my invention to the proportions stated because they can be varied to suit the percentage and kind of impurities present in the gypsum and the strength and weight of the board desired. It is only necessary to use enough acid to chemically react with the carbonates or other impurities present and to be neutralized by them. When the carbonates are not present to the extent indicated, obviously less acid is required and, inasmuch as the acid has an appreciable effect upon the viscosity of the paste, it will be necessary, in such case, to use a larger proportionate amount of starch in preparing the paste. When the gypsum is substantially pure, I contemplate adding a carbonate or other suitable material to it so that the beneficial effects of the acid or other equivalent agent in combination therewith may be obtained. The appended claims, therefore, cover gypsum containing a carbonate or other impurity either in the natural state or rock or as an added ingredient. I do not intend to limit my invention to the use of sulphuric acid only as other inorganic and some organic acids and other suitable agents will produce the desired acceleration in the set and hardening of the gypsum by forming their corresponding nascent salts in the mass.

I do not intend to limit my invention to the details of construction and the detail steps of manufacture shown and described, except only in so far as certain of the appended claims are specifically so limited, as it will be obvious to those skilled in the art that various modifications and changes therein may be made without departing from the principles of my invention.

It will be apparent to those skilled in the art that the insulating material, when prepared in the manner herein described, is well adapted for the manufacture of wall products other than wall board, for example, blocks and plaster board, also as a covering for steam and hot and cold water pipes, refrigerating machinery, boilers, furnaces and the like.

I claim:

1. An insulation member formed by shaping and drying a body of material resulting from the mixture of a quantity of hydro-amylaceous paste, and a quantity of acid, a portion of which acid reacts with the paste for increasing its viscosity, with a quantity of comminuted calcined gypsum containing an impurity which reacts with a portion of said acid for producing a nascent salt.

2. The method of producing an insulating member, which comprises mixing water and starch, heating the same for causing the starch to be dissolved, increasing the viscosity of the starch paste by the mixture of acid therewith, and mixing with the acidulated paste a quantity of comminuted calcined gypsum.

3. The method of producing an insulating member, which comprises mixing water and starch, heating the same for causing the starch to be dissolved, increasing the viscosity of the starch paste by the mixture of acid therewith, and mixing with the acidulated paste a quantity of comminuted calcined gypsum containing a quantity of an impurity adapted by reaction with a portion of the acid in the paste to form a nascent salt in the mixture.

CHARLES E. HITE.